United States Patent [19]

Krahe

[11] Patent Number: 4,582,262
[45] Date of Patent: Apr. 15, 1986

[54] PROCESS FOR THE PREPARATION OF GRANULAR REFRACTORY MATERIAL

[76] Inventor: Helmut Krahe, Inselstrasse 13, D - 4000 Düsseldorf, Fed. Rep. of Germany

[21] Appl. No.: 528,066

[22] Filed: Aug. 31, 1983

[30] Foreign Application Priority Data

Sep. 1, 1982 [DE] Fed. Rep. of Germany ..... 32324405

[51] Int. Cl.$^4$ ............................................. B02C 19/12
[52] U.S. Cl. ......................................... 241/22; 241/23
[58] Field of Search ...................... 241/22, 16, 23, 30, 241/24, 101 D

[56] References Cited

U.S. PATENT DOCUMENTS 2,112,333  3/1938  Crew ................................. 241/22 X

FOREIGN PATENT DOCUMENTS 1900297  1/1973  Fed. Rep. of Germany .

OTHER PUBLICATIONS

Die Edelstahl Erzeugung, 2nd Edition, 1965, pp. 381 & 753.

*Primary Examiner*—Mark Rosenbaum
*Attorney, Agent, or Firm*—Kenyon & Kenyon

[57] ABSTRACT

A process for the preparation of a granular refractory material for producing chemically bonded and/or tar-bonded linings of improved durability, especially in the form of bricks, for metallurgical vessels is disclosed. Magnesite or schamotte particles are impregnated with hot tar, pitch, bitumen, asphalt or mixtures thereof and are then heated under coking conditions. In impregnating the magnesite particles, finely divided calcium hydroxide, in an amount sufficient to improve the CaO/SiO$_2$ ratio of the magnesite, is uniformly dispersed in the hot tar, pitch, bitumen, asphalt or mixtures thereof serving as the impregnating material.

12 Claims, No Drawings

PROCESS FOR THE PREPARATION OF GRANULAR REFRACTORY MATERIAL

FIELD OF INVENTION

The invention relates to a process for the preparation of granular refractory material for producing chemically bonded and/or tar-bonded linings with improved durability, especially in the form of bricks, for metallurgical vessels.

BACKGROUND OF THE INVENTION

It is known to mix refractory material, such as fired dolomite or fired magnesite, with carbon-containing binder in order to increase the resistance of the linings for metallurgical vessels produced therefrom against attack by slag, to press moldings from the mixture and then to consolidate these by heating for several hours in the temperature range from 200° to 400° C. (German Auslegeschrift No. 1,900,297).

It is also known that the durability of schamotte linings can be improved by admixture of 2 to 20% of graphite or by impregnating schamotte bricks with tar [Leitner-Plockinger "Die Edelstahlerzeugung" (Manufacture of Stainless Steel), 2nd edition, 1965, pages 381 and 753].

The admixture of carbon to the refractory material increases the ability to withstand temperature changes but also increases the resistance to slag and the strength of the lining of metallurgical vessels. Before being fitted into the vessel, the bricks can be subjected to a coking treatment. The coking of the carbon-containing binder of the lining can however also take place under use conditions, e.g., upon contact with the molten metal.

OBJECT OF THE INVENTION

It is an object of the present invention to provide an improved process for the preparation of granular refractory material.

It is another object of the present invention to provide inexpensive granular refractory material, namely schamotte and second-class magnesites having a CaO/SiO$_2$ ratio of less than 1.8, which material can, with the addition of a binder, be used in a simple manner directly for producing a lining of improved durability for metallurgical vessels.

These and other objects of the present invention will become apparent from the following description and claims.

SUMMARY OF THE INVENTION

The present invention may be generally summarized as a process for the preparation of granular refractory material for producing chemically bonded and/or tar-bonded linings of improved durability, especially in the form of bricks for metallurgical vessels, wherein finely divided carbon in the form of graphite, petroleum coke, low-ash coke from coal or the like or mixtures thereof is admixed with a finely divided ceramic refractory raw material and the mixture is fired, preferably under reducing conditions, and then granulated.

The main advantage of the invention is that it provides a material which directly permits processing to produce a lining, without the measures which the producer of the lining previously had to carry out, namely mixing the granular refractory material with tar, pitch, bitumen or asphalt.

At the same time, in accordance with the present invention, cheaper lower-grade refractory material in an enriched form can be employed to produce metallurgical linings of improved durability. Linings or bricks, of any desired shape, can be produced from the material in the form of a mass which can be injected, cast or tamped. The porosity of the lining produced from the refractory material, in accordance with the process of the present invention, is less than that of linings produced in a conventional manner.

DESCRIPTION OF THE PREFERRED EMBODIMENTS

In order to provide a more complete understanding of the present invention and an appreciation of its advantages, a description of the preferred embodiments is presented below.

The nub of the invention is the deposition of carbon on very fine ceramic grains. On subsequent heat treatment under coking or low temperature carbonization conditions, volatile constituents are expelled, so that these do not detract from the density of the lining produced from the granular refractory material. The firing of the very fine ceramic grains impregnated with a finely divided carbon material may take place in an oxidizing or reducing atmosphere. A reducing atmosphere is preferred. The granular refractory material, impregnated with tar, pitch, bitumen or asphalt, which is thus produced can be directly converted to a lining, with addition of waterglass, phosphate binder or the like as chemical binders, with addition of tar, pitch, bitumen or the like, or with addition of tar-coated or pitch-coated finer non-heated grains of ceramic refractory material, preferably of the same type.

At the same time, the calcium hydroxide admixed to the impregnating material improves the CaO content of magnesite. Suitably, finely divided calcium hydroxide is admixed with the carbon impregnating material. As a result of the penetration of the finely divided calcium hydroxide, finely dispersed in the impregnating material, into the pores and cracks of the magnesite body, the enrichment according to the process of the invention takes place particularly intensively and uniformly.

EXAMPLE

A clay containing about 50% of Al$_2$O$_3$ was mixed with 6% of C in a very finely divided form (DIN 70) and the mixture was calcined at 1600° C. The resulting raw material had a carbon content of 5.8% after heating under a reducing atmosphere and of 4–4.5% after heating in an oxidizing atmosphere. The resulting particle size was in the range up to 15 mm. Microphotographs gave a homogeneous appearance of the clay/carbon mixture. Closed pores were found.

Although preferred embodiments of the present invention have been described in detail, it is contemplated that modifications may be made within the spirit and the scope of the present invention.

What is claimed is:

1. A process for the preparation of granular refractory material for producing bonded linings of improved durability of the type selected from the group consisting of chemically bonded linings and tar bonded linings and mixtures thereof said process comprising admixing finely divided carbon material with finely divided ceramic refractory raw material, firing said mixture and then granulating.

2. A process as recited in claim 1 wherein said carbon material is selected from the group consisting of graphite, petroleum coke, low-ash coke from coal, and mixtures thereof.

3. A process as recited in claim 2 wherein said firing takes place under reducing conditions.

4. A process as recited in claim 3 wherein said finely divided ceramic refractory material is selected from the group consisting of magnesite and schamotte.

5. A process as recited in claim 4 wherein said refractory material is magnesite and wherein finely divided calcium hydroxide is mixed with said carbon material.

6. A process as recited in claim 2 wherein said finely divided ceramic refractory material is selected from the group consisting of magnesite and schamotte.

7. A process as recited in claim 6 wherein said refractory material is magnesite and wherein finely divided calcium hydroxide is mixed with said carbon material.

8. A process as recited in claim 1 wherein said firing takes place under reducing conditions.

9. A process as recited in claim 8 wherein said finely divided ceramic refractory material is selected from the group consisting of magnesite and schamotte.

10. A process as recited in claim 9 wherein said refractory material is magnesite and wherein finely divided calcium hydroxide is mixed with said carbon material.

11. A process as recited in claim 1 wherein said finely divided ceramic refractory material is selected from the group consisting of magnesite and schamotte.

12. A process as recited in claim 11 wherein said material is magnesite and wherein finely divided calcium hydroxide is admixed with said carbon material.

* * * * *